United States Patent [19]
Stollorz

[11] 4,150,406
[45] Apr. 17, 1979

[54] TRANSDUCER LIFTING MEANS EMPLOYING PLURAL FLEXURES

[76] Inventor: Herbert R. Stollorz, 77 Mercedes La., Atherton, Calif. 94025

[21] Appl. No.: 855,920

[22] Filed: Nov. 30, 1977

[51] Int. Cl.² .............................................. G11B 5/82
[52] U.S. Cl. ...................................... 360/97; 360/78; 360/133
[58] Field of Search .................................. 360/97–99, 360/78, 133, 96

[56] References Cited
U.S. PATENT DOCUMENTS

| 3,635,608 | 1/1972 | Crouch et al. | 360/133 X |
| 4,005,490 | 1/1977 | Duncan et al. | 360/77 |
| 4,056,831 | 11/1977 | Godbout et al. | 360/78 X |
| 4,062,049 | 12/1977 | Dirks | 360/98 X |

*Primary Examiner*—John H. Wolff
*Attorney, Agent, or Firm*—Paul F. Schenck

[57] ABSTRACT

A flexure supported actuator arm carries a plurality of transducer means, each connected to the actuator arm by one flexure; all transducer means are loaded or unloaded by a common lifting mechanism.

1 Claim, 9 Drawing Figures

TRANSDUCER LIFTING MEANS EMPLOYING PLURAL FLEXURES

BACKGROUND OF THE INVENTION

Disk storages are random access stores for mass data in computing systems. A disk storage includes two major components:

disk drive with one or more storage disks, and storage controller.

The disk drive comprises the mechanical assembly for operating the storage disk, for accessing storage tracks on storage disks, and some electronic circuitry for interfacing with the controller.

The controller supervises the execution of commands supplied to the controller from the processor of the computing system, and performs certain signal processing operations. Signal processing includes conversion of information signals supplied by a data source in the computing system to suitable signals for controlling the drive or for recording on a storage track, and converting signals received from the drive to information signals suitable for communication with the computing system. Controllers differ mainly in the complexity of the signal processing.

Disk drives are characterized by storage capacity, data access time, data transfer rate, and removability of the storage medium. Storage capacity is a function of storage surface and recording density; data transfer rate is a function of rotational speed of the storage medium and recording density; data access time is a function of storage track density and movability of the access mechanism.

Storage removability provides a freedom to let the computing system operate on a large number of different types of data without the need for a large number of disk drives. The exchangeability of storage disks and storage disk packs requires compatibility between disk drives and compatibility between storage disks.

Compatibility between components demands tight control during manufacturing of the components and conservative selection of dimensions and characteristics such as recording density and track density.

SUMMARY OF THE INVENTION

It is an object of this invention to provide a high volume data storage.

It is an object of this invention to provide for a dustproof data storage.

It is another object of this invention to provide for an integrated modular storage unit.

It is still another object of this invention to provide for a ruggedized modular storage unit.

It is another object of this invention to provide for a low cost high performance disk storage unit.

It is still another object of this invention to provide a new modular storage access mechanism.

DESCRIPTION OF THE INVENTION

The present invention relates to disk storages with removable storage disks. However, it departs from the concept of removing the storage disk from the disk drive. The present invention uses a storage module which is removably mounted in a rack of the computing system. The module includes one or more storage disks, a motor for rotating the storage disks, and an access mechanism for reading or writing data in selected tracks. It includes the electronic interface to the controller. The module is mounted in the system rack with a new type of shock resistant suspension arrangement, which makes the module applicable for operation in non-office environments. The module is sealed. For exchanging one module the electrical connection to the controller has to be disconnected and the module can be taken from the rack.

The access mechanism employs a low flying narrow track signal head, whereby recording and track densities are increased, resulting in an increase of storage capacity over present systems of the same size. The increase in storage capacity and the integration of storage disk and disk drive in the storage unit of the present invention let the new storage unit be of the same size as a disk pack with the same storage capacity but without a drive. Storage units can be removed as easily as disk packs by disconnecting the electrical connection to the controller and sliding the unit out of the rack. No protective precautions are necessary. The storage unit is dustproof sealed and the signal heads are unloaded and cannot contact the storage surface while the unit is not in operation.

DESCRIPTION OF THE PREFERRED EMBODIMENT

Figures 1A, 1B:
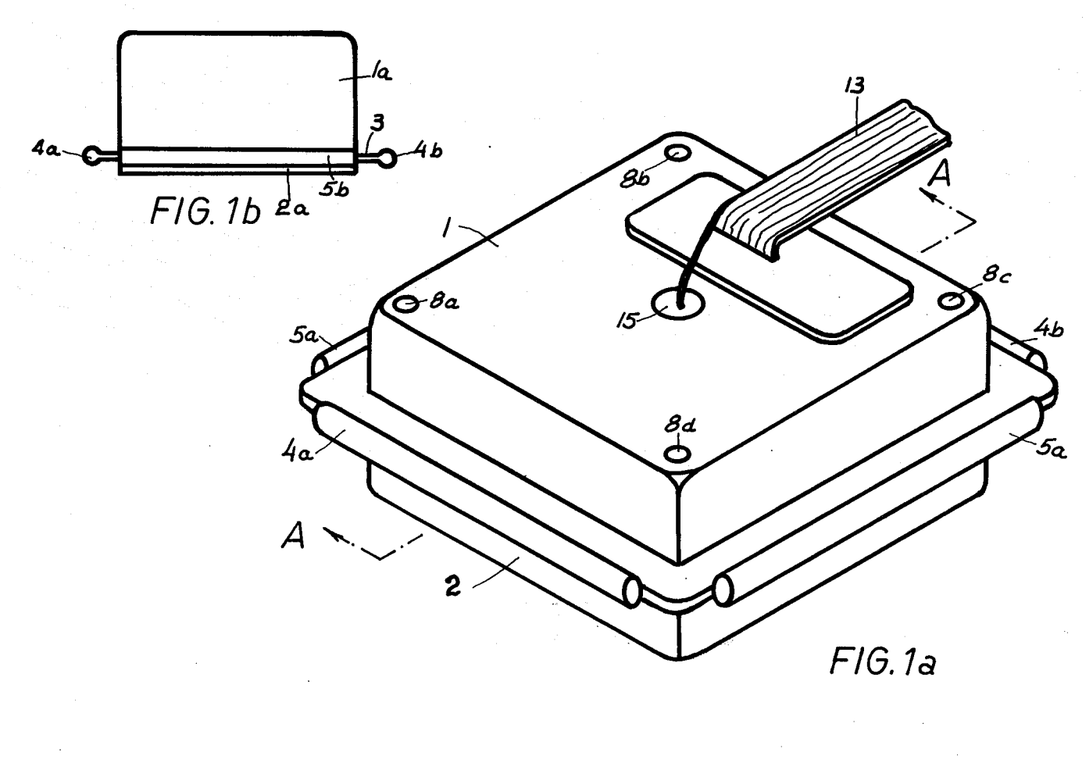
FIG. 1a is an illustration of a modular storage unit having a top and bottom cover.
FIG. 1b is a side view of a modular storage unit having a baseplate and a cover.
Figure 2:
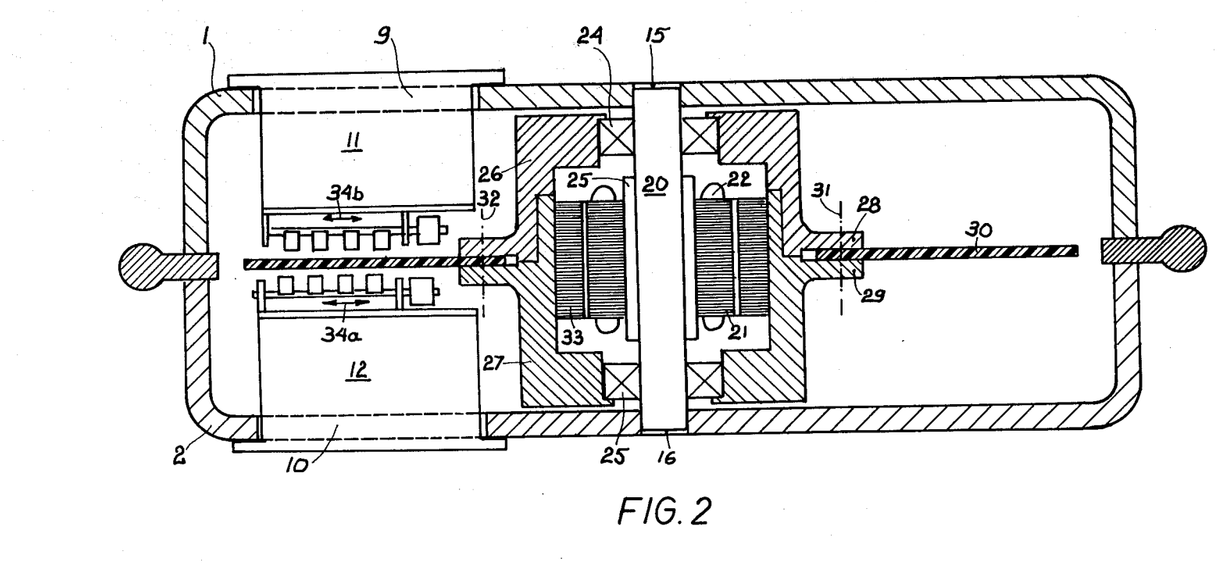
FIG. 2 is a cross-sectional illustration of a first embodiment of a modular storage unit.

FIG. 1a is an illustration of a modular storage unit of the present invention. FIG. 2 is an illustration of cross-section A—A of the modular storage unit of FIG. 1a.

Major components of the modular storage unit are the enclosure, a drive motor, one or more storage disks, and one or more data access mechanisms. The drive motor rotates the storage disks. The data access mechanisms include signal heads for reading or writing data on storage tracks of the storage disks.

Figure 3:
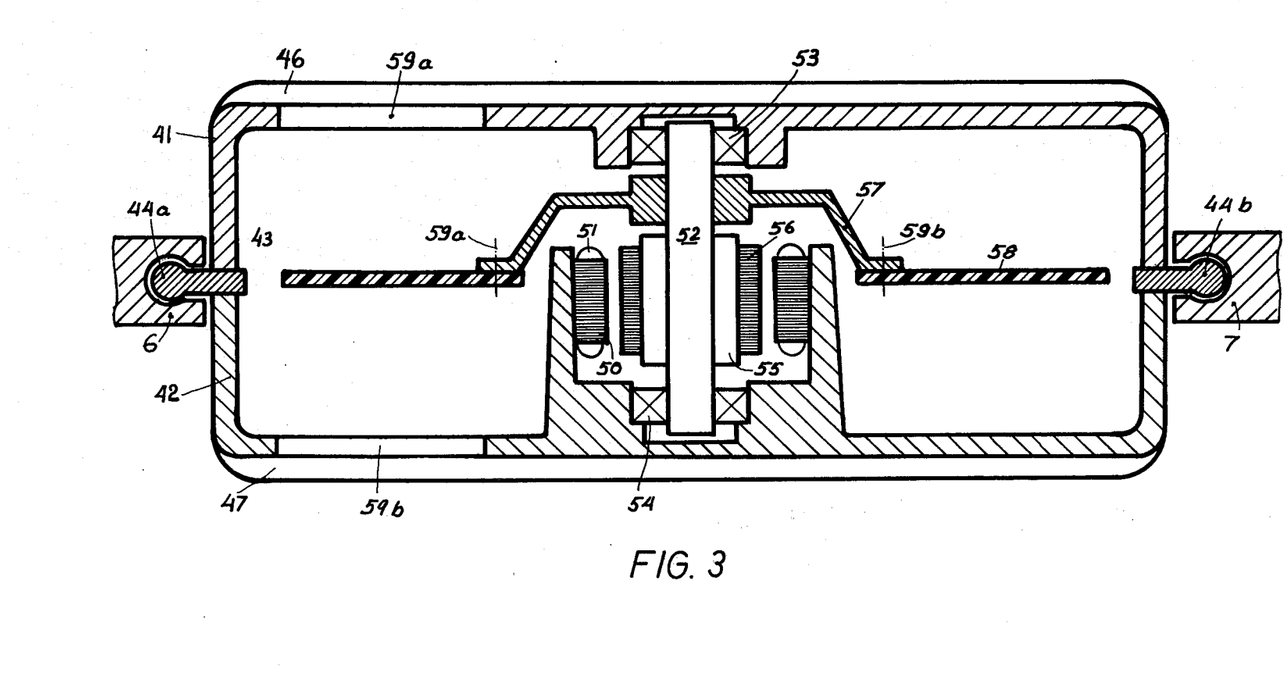
FIG. 3 is a cross-sectional illustration of a second embodiment of a modular storage unit.

The enclosure of the modular storage unit consists of an upper shell 1, a lower shell 2, and an elastic sealing ring 3. The sealing ring 3 has two pairs of rails 4a, 4b and 5a, 5b. The pairs of rails 4a, 4b and 5a, 5b are provided for mounting the storage unit in a rack having sliding guides 6 and 7 (FIG. 3). The storage unit can be mounted horizontal or vertical. Thus sealing ring 3 performs two functions, providing a dustproof seal between upper enclosure section 1 and lower enclosure section 2, and providing a shock resistant mount for the storage unit.

The storage unit interfaces with the control unit by cable 13.

As indicated in FIG. 1b the modular storage unit may have a baseplate 2a and a cover 1a instead of upper and lower enclosure shells 1 and 2 of FIG. 1a. The two sections are held together by screws 8a through 8d as indicated in FIG. 1a.

FIG. 2 is an illustration of a first embodiment of the storage unit of the present invention. The upper enclosure shell 1 and the lower enclosure shell 2 have openings 15 and 16 for receiving stator shaft 20 of the disk drive motor. The disk storage drive motor includes stator package 21 with stator windings 22 mounted on sleeve 25 of shaft 20. The electrical connections to stator windings 22 are made through openings in shaft 22. The two bearings 24 and 25 support the rotor on stator shaft 20. The rotor consists of upper rotor shell 26 and lower rotor shell 27.

Each of the rotor shells 26 and 27 has a flange 28 and 29, respectively. Storage disk 30 is mounted between flanges 28 and 29 and secured by screws in several locations on a circle indicated by lines 31 and 32. The upper rotor shell 26 carries on the inside a rotor package 33, interacting with the magnetic field generated by a current passing through stator windings 22 for rotating storage disk 30 around stator shaft 20. The arrangement of field windings 22 and rotor package 33 is suitable for A.C. type motor arrangements. However, if a D.C. type motor arrangement is desired, a commutator can be attached to rotor shell 26 for supplying an electrical current to the rotor field windings of such an arrangement.

Upper enclosure shell 1 has an opening 9 for mounting a data access mechanism 11; lower enclosure shell 2 has an opening 10 for mounting a data access mechanism 12. Openings 9 and 10 require dustproof sealing between enclosure shell and attached data access mechanism or a blind cover, if no mechanism is installed.

The basic features of a data access mechanism as may be used with the storage unit of the present invention are shown on FIG. 4 and described with reference to the same FIGURE. Each of the data access mechanisms 11 and 12 has a plurality of signal heads, which are adapted to read or write data in a track of the storage disk of the present invention. Each group of heads is movable in radial direction across the associated storage surface of storage disk 30, as indicated by arrows 34a and 34b.

FIG. 3 is an illustration of a second embodiment of a storage module having a drive motor with outer stator and inner rotor. The storage unit consists of an upper shell 41 and a lower shell 42 separated by a dustproof seal 43, which includes rails 44a, 44b for mounting the storage unit in guides 6 and 7 of a rack mounting arrangement. Shells 41 and 42 are equipped with cooling ribs 46 and 47.

The disk drive motor consists of stator package 50 with stator windings 51. The rotor consists of shaft 52 supported by bearings 53 and 54 in the upper and lower shells 41 and 42, respectively. Shaft 52 carries on a sleeve 55 rotor package 56, the later interacting with the magnetic field generated by stator windings 51 for rotation of the rotor. The rotor further comprises a dish 57 and storage disk 58. Storage disk 58 is affixed to dish 57 by several screws on the perimeter of a circle indicated by lines 59a and 59b. The access mechanism for reading and recording data on storage disk 58 may be the same as indicated on FIG. 3 and is mounted in openings 59a and 59b.

Figure 4:
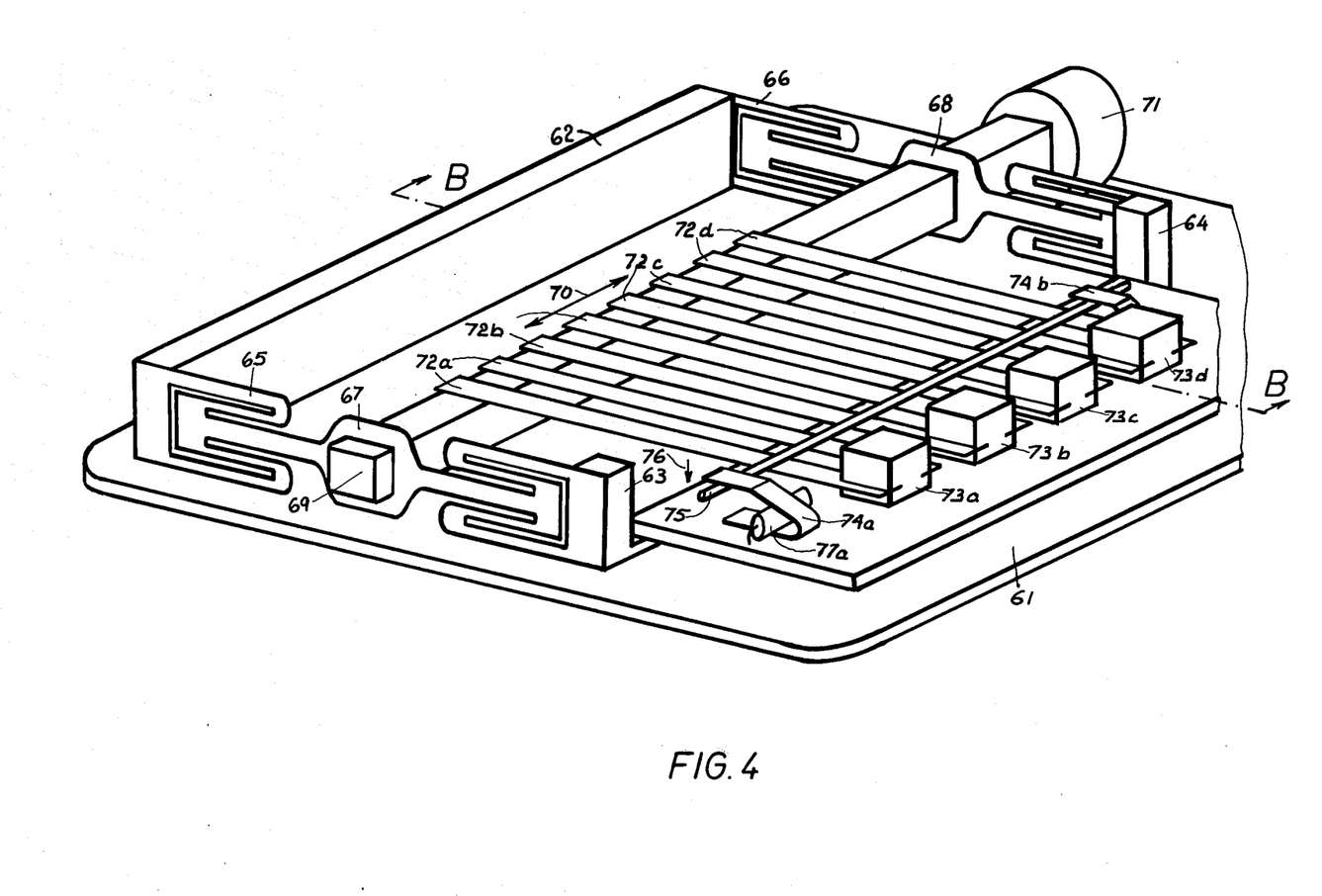
FIG. 4 is a perspective illustration of a data access mechanism.
Figure 6A:
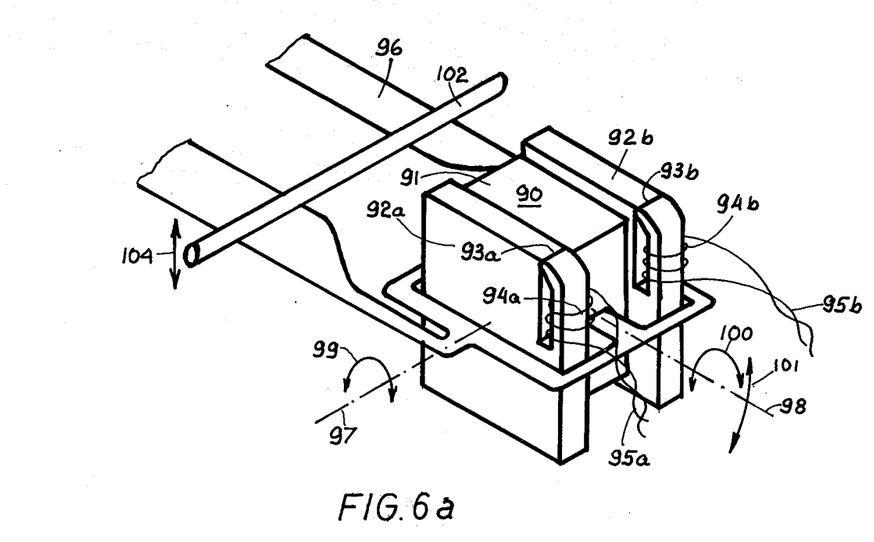
FIG. 6a is an illustration of a first signal head/flexure arrangement of the data access mechanism of FIG. 4.

FIG. 4 is a perspective illustration of a data access mechanism which can be used in a storage unit of the present invention as shown in FIGS. 2 and 3. In FIG. 4 the associated storage disk (not shown in FIG. 4) rotates above the access mechanism. The access mechanism is mounted on baseplate 61. A rear wall 62 and two posts 63 and 64 support two flexures 65 and 66. The center sections 67 and 68 of flexures 65 and 66 carry rod 69, providing movability for rod 69 in the direction of its axis as indicated by double arrow 70. Rod 69 is preferrably made from hollow material to reduce mass. Rod 69 assumes a quiescent position under the influence of flexures 65 and 66 if no further outside force is imposed on it. Deflections from quiescent position can be caused by actuator 71, which may be of a voice-coil type drive or other suitable means for imposing a force on rod 69 for movement in one of the directions indicated by arrow 70. Rod 69 carries four pairs of flexures 72a, 72b, 72c, and 72d which, in turn, support each one transducer or signal head 73a, 73b, 73c, and 73d, respectively. In FIG. 4 flexures 72a through 72d and signal heads 73a through 73d are shown in a simplified representation. A more detailed illustration of a combination of a flexure 72 and a signal head 73 is shown in FIG. 6a. Actuator 71 can be mounted as shown in FIG. 4 or in a suitable space between flexures 65 and 66.

Signals heads 73a through 73d are of an air bearing type, which operate in close proximity to the data storing surface of the storage disk, and which require a certain rotational speed of the storage disk to generate sufficient air flow between storage surface and airbearing skis of the signal head for low-flying operation at 100 micro-inches or less above the data storing surface.

Flexures 72 counter the air pressure generated between the data storing surface of the storage disk and the signal head. In order to prevent contact between signal head and data storing surface while the storage disk is not rotating or is rotating at a speed to low for proper flying of the signal heads 73 a through 73d a loading mechanism is attached. The loading mechanism consists of two thermal responsive stripes 74a and 74b interconnected by loading bar 75. Loading bar 75 is moved by stripes 74a and 74b substantially perpendicular to the surface of storage disk 80. For unloading signal heads 73a through 74d bar 75 is moved in the direction of arrow 76. Loading heads 73a through 73d for operation is executed by moving bar 75 in a direction opposite to arrow 76. Bar 75 is moved in the direction opposite to arrow 76 by thermal stripes 74a and 74b in response to heat generated in heating elements such as resistors 77a and 77b. While in operation an electrical current passes through heating elements 77a and 77b, raising the temperature at the thermal responsive stripes 74a and 74b, whereby bar 75 is raised. Signal heads 73a through d are brought closer to the surface of the data storing disk and assume flying operation as soon as they reach operational proximity. If heads 73a through 73d are to be unloaded, moved away from the signal storing surface of storage disk 80, current through heating elements 77a and 77b is shut off, cooling off stripes 74a and 74b, whereby bar 75 moves in the direction of arrow 76, pressing down on flexures 72a through 72d moving heads 73a through 73d away from the surface of storage disk 80.

Figure 5:
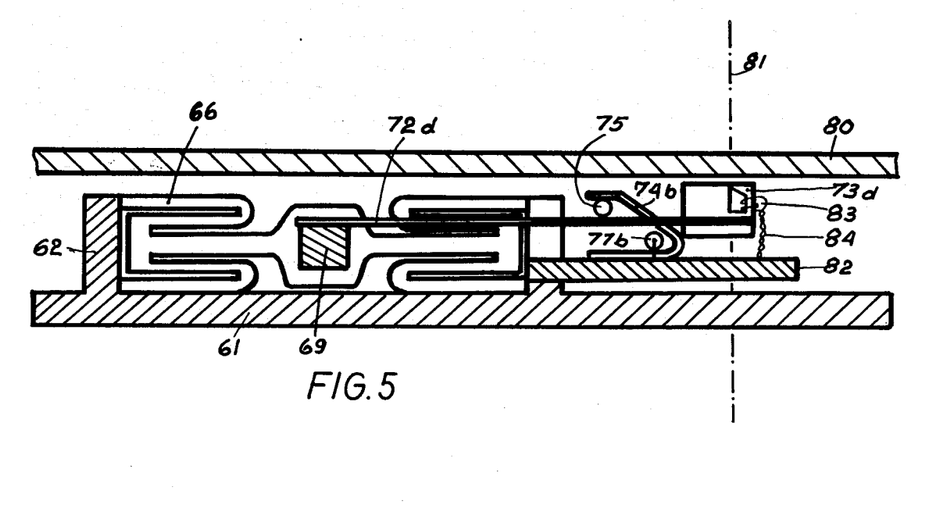
FIG. 5 is a cross-sectional illustration of the data access mechanism if FIG. 4.

FIG. 5 is a more detailed illustration of the access mechanism relative to storage disk 80. The illustration of FIG. 5 is a simplified view of cross-section B—B, indicated in FIG. 4.

Dashed line 81 marks the axis around which disk 80 rotates. Signals heads 73a through 73d are aligned for movement in a radial direction relative to axis 81. Both heating elements 77a and 77b and thermal responsive stripes 74a and 74b are mounted on board 82. Board 82 is a printed circuit board which carries all electronic components necessary to interface the controller with the storage unit. The signal coils 83 of signal heads 73 are directly connected to terminals on the electronic board 82 by wires 84.

FIG. 6a is an illustration of a dual track signal head 90 which can be used in a storage unit of the present invention. The signal head consists of a core separating body 91 and attached core slices 92a and 92b. Each of the core slices 92a and 92b have a gap 93a and 93b, respectively, for recording or sensing signal, and a coil 94a and 94b, respectively, for generating or sensing magnetic fields in core slices 92a and 92b. Leads 95a and 95b connect coils 94a and 94b to the interface electronic on board 82. The head is mounted in a flexure 96 providing for movement around two axes 97 and 98, and in one direction as indicated by arrows 99, 100, and 101. The movement around the two axes 97 and 98 as indicated by arrows 99 and 100 is necessary for flying as close proximity to the surface of the associated storage disk. Movement in direction of arrow 101 is controlled by the balance between loading force of the signal head and air pressure between signal head and the surface of the storage disk, while the signal head is loaded; the movement in direction of arrow 101 is controlled by loading bar 102 while the signal head 90 is unloaded or in process of being loaded or unloaded.

Loading bar 102 may be effective on flexure 96 between signal head 90 and the actuator rod (not shown in FIGS. 6a, 6b and 6c) as indicated in FIG. 6a. Loading bar may also be made effective on an extension 104 of flexure 96, as indicated on FIG. 6b.

In FIGS. 4, 5, 6a, and 6b signal heads 73a through 73d, and 90 are loaded and unloaded by a loading bar 75, 102, and 103, respectively, operated by a thermal responsive stripe, such as a bimetal stripe.

Figures 6B, 6C:
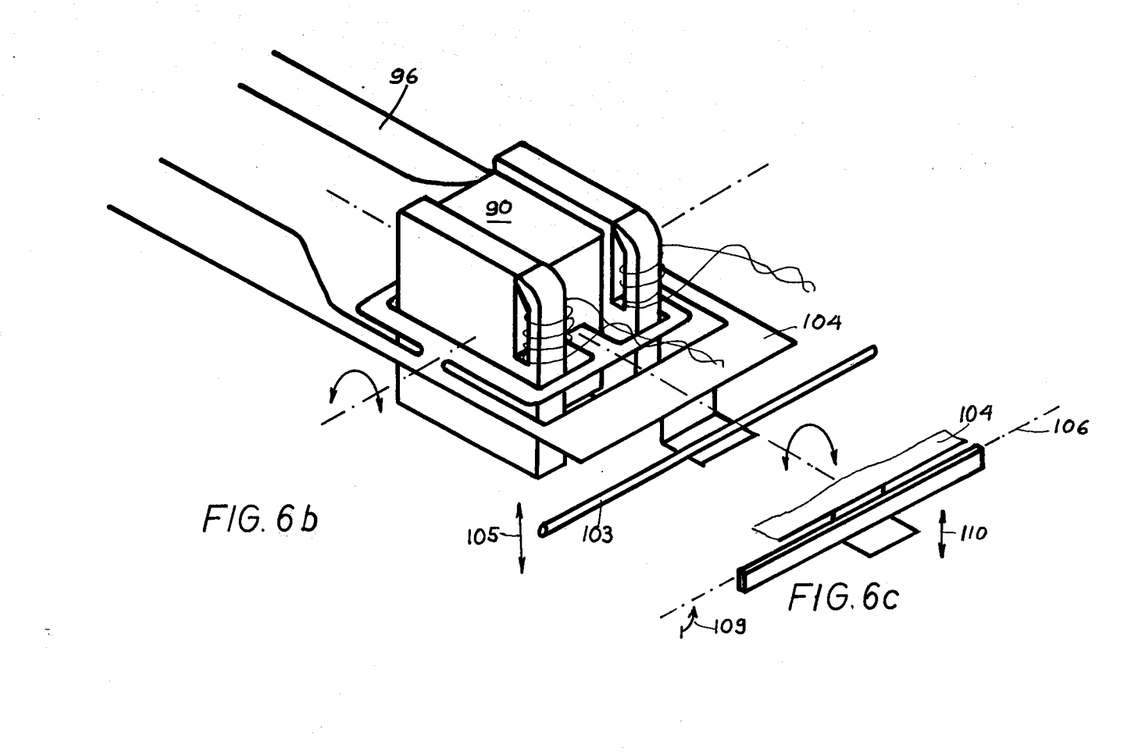
FIG. 6b is an illustration of a second signal head/flexure arrangement of the data access mechanism of FIG. 4.
FIG. 6c is an illustration of a different loading bar arrangement for loading and unloading the signal heads of FIGS. 6a and 6b.

FIG. 6c is an illustration of a loading mechanism using a rectangular bar turned by a solenoid or the like around an axis 106 as indicated by arrow 109, thereby forcing flexure extension 104 in direction of arrow 107, or releasing the flexure for flying signal head 90 in operative proximity to the signal storing surface.

The storage unit of the present invention combines two new features:
  low-flying signal heads for reading and writing at high bit and track densities, and
  a new access mechanism with multiple signal heads and
  a new suspension arrangement for fast storage track access.

Both features together improve storage density and access time over existing storage devices. The integration of of high density storage disk, fast access mechanism, a disk drive motor and some interface electronic to the controller in one unit results in a modular storage unit. A new rack mount method allows to provide fast exchange of storage modules, comparable to the exchange of disk packs in storage arrangements of present systems. The features of the modular storage unit of the present invention have been shown in the description of the preferred embodiment. While there are disclosed several variations in the implementation it is understood that other changes in form and details of the arrangement may bemade without departing from the spirit and the scope of the invention.

What I claim is:

1. In a storing device for signals including at least one rotating magnetic storage disk having at least one signal storing surface including storage tracks for storing data, access means with individually suspended transducer means for reading or writing data in said storage tracks, wherein the access means comprise
  a baseplate;
  an actuator rod;
  two first flexure means spaced apart and mounted on said baseplate, and supporting said actuator rod therebetween at two spaced locations for movement of said actuator rod along its longitudinal axis;
  each of said first flexures including two mounting means for attaching each of said flexures to said baseplate, means for receiving said actuator rod, and opposed elastic connecting portions, spaced symmetrically to said means for receiving, and interconnecting said means for receiving with said mounting means;
  a plurality of transducer means;
  a plurality of second flexure means, connected to said actuator rod, each including means for receiving one of said transducer means;
  transducer lifting means including a loading bar and a spaced pair of thermoelectrically energized suspension means which are selectively energizable so that the loading bar and the associated transducer means are positioned for flying in operative proximity to said signal storage surface when said lifting means are energized and said transducer means assume an inoperative position spaced from said signal storage surface when said transducer lifting means are deenergized.

* * * * *